United States Patent
Saastamoinen et al.

(10) Patent No.: US 12,166,195 B2
(45) Date of Patent: Dec. 10, 2024

(54) METHOD FOR REDUCING INTERNAL RESISTANCE OF A BATTERY AND A BATTERY WITH REDUCED INTERNAL RESISTANCE

(71) Applicant: Spindeco Technologies Oy, Kuopio (FI)

(72) Inventors: Pekka Tapani Saastamoinen, Kuusamo (FI); Reijo Lappalainen, Hiltulanlahti (FI); Petteri Koljonen, Kuopio (FI)

(73) Assignee: QID OY, Helsinki (FI)

( * ) Notice: Subject to any disclaimer, the term of this patent is extended or adjusted under 35 U.S.C. 154(b) by 411 days.

(21) Appl. No.: 17/624,680

(22) PCT Filed: Jul. 10, 2020

(86) PCT No.: PCT/FI2020/050492
§ 371 (c)(1),
(2) Date: Jan. 4, 2022

(87) PCT Pub. No.: WO2021/005272
PCT Pub. Date: Jan. 14, 2021

(65) Prior Publication Data
US 2022/0263057 A1 Aug. 18, 2022

(30) Foreign Application Priority Data
Jul. 11, 2019 (FI) .................................. 20195627

(51) Int. Cl.
*H01M 4/04* (2006.01)
*H01M 10/0525* (2010.01)
(Continued)

(52) U.S. Cl.
CPC ..... *H01M 4/0447* (2013.01); *H01M 10/0525* (2013.01); *H01M 10/054* (2013.01); *H01M 10/4235* (2013.01); *H01M 10/446* (2013.01)

(58) Field of Classification Search
CPC ........ H01M 4/04; H01M 4/0447; H01M 4/13; H01M 4/139; H01M 4/1397;
(Continued)

(56) References Cited

U.S. PATENT DOCUMENTS

| 4,611,260 A | * | 9/1986 | Bauer | .................. | H10N 30/045 |
| | | | | | 29/25.35 |
| 5,378,551 A | | 1/1995 | Meadows et al. | | |

(Continued)

FOREIGN PATENT DOCUMENTS

| CN | 1468455 A | 1/2004 |
| CN | 1770508 A | 5/2006 |

(Continued)

OTHER PUBLICATIONS

CN-106848201-A translation from FIT database (Year: 2024).*
(Continued)

*Primary Examiner* — Jeffrey T Carley
*Assistant Examiner* — Joshua D Anderson
(74) *Attorney, Agent, or Firm* — Merchant & Gould P.C.

(57) ABSTRACT

A method reduces internal resistance of a battery (204, 300). In the method, a charging current is directed to a battery (204, 300), where the charging current includes spin-polarized and charged electrons. A dedicated spin generator (203) is capable of providing the charging current including spin-polarized and charged electrons. Next, the battery (204, 300) has been manufactured so that the battery includes either ferroelectric or pyroelectric material at least either in an anode (305), in a cathode (302), or in an other element of the battery (204, 300). The material can be selected to be polyvinylidene fluoride ("PVDF") or modified materials thereof. After at least one cycle of charging of the battery (204, 300), the battery (204, 300) with reduced internal resistance is obtained.

6 Claims, 6 Drawing Sheets

(51) Int. Cl.
  *H01M 10/054* (2010.01)
  *H01M 10/42* (2006.01)
  *H01M 10/44* (2006.01)

(58) Field of Classification Search
  CPC .... H01M 4/1399; H01M 4/364; H01M 4/621; H01M 4/622; H01M 4/623; H01M 10/0525; H01M 10/054; H01M 10/058; H01M 10/4235; H01M 10/44; H01M 10/446; Y10T 29/49108; H01L 29/66984; H02J 7/0069
  See application file for complete search history.

(56) References Cited

U.S. PATENT DOCUMENTS

| | | | | |
|---|---|---|---|---|
| 5,491,879 | A * | 2/1996 | Bauer | H10N 30/045 |
| | | | | 29/25.35 |
| 6,956,269 | B1 * | 10/2005 | Vashchenko | H01L 29/66984 |
| | | | | 257/427 |
| 8,736,151 | B2 * | 5/2014 | Burgener, II | H02N 11/002 |
| | | | | 310/358 |
| 2003/0157766 | A1 * | 8/2003 | Uchiyama | H10B 12/31 |
| | | | | 257/E21.272 |
| 2004/0137326 | A1 | 7/2004 | Munshi | |
| 2005/0023630 | A1 * | 2/2005 | Osipov | B82Y 10/00 |
| | | | | 257/421 |
| 2005/0026307 | A1 * | 2/2005 | Osipov | H10N 50/10 |
| | | | | 257/E43.004 |
| 2010/0102319 | A1 * | 4/2010 | Xie | H01L 29/66984 |
| | | | | 257/295 |
| 2010/0196765 | A1 | 8/2010 | Palazzo | |
| 2012/0126704 | A1 * | 5/2012 | Blom | H10K 59/80 |
| | | | | 257/E51.024 |
| 2012/0320492 | A1 * | 12/2012 | Radivojevic | H01M 4/66 |
| | | | | 29/25.03 |
| 2013/0140059 | A1 * | 6/2013 | Koljonen | H01B 12/06 |
| | | | | 977/933 |
| 2014/0342192 | A1 | 11/2014 | Wang | |
| 2016/0087129 | A1 * | 3/2016 | Gibertini | G01R 33/1284 |
| | | | | 156/60 |
| 2017/0125814 | A1 | 5/2017 | Yadav | |
| 2018/0151867 | A1 * | 5/2018 | Lim | H01M 4/0435 |
| 2020/0194566 | A1 * | 6/2020 | Manipatruni | H01L 29/423 |

FOREIGN PATENT DOCUMENTS

| | | | | |
|---|---|---|---|---|
| CN | 102931341 | A | | 2/2013 |
| CN | 104025345 | A | | 9/2014 |
| CN | 106848201 | A * | 6/2017 | |
| CN | 107851840 | A | | 3/2018 |
| CN | 108428855 | A | | 8/2018 |
| CN | 109314234 | A | | 2/2019 |
| CN | 109659500 | A | | 4/2019 |
| EP | 3002807 | A1 | | 4/2016 |
| EP | 3226271 | A1 * | 10/2017 | G11C 11/22 |
| JP | 2015191967 | A * | 11/2015 | |
| KR | 20160040046 | A | | 4/2016 |
| KR | 20230142282 | A * | 10/2023 | |
| KR | 102614930 | B1 * | 12/2023 | |
| WO | 2008138003 | A1 | | 11/2008 |
| WO | WO-2018229331 | A1 * | 12/2018 | H01B 1/026 |

OTHER PUBLICATIONS

JP-2015191967-A translation from FIT database (Year: 2024).*
EP-3226271-A1 translation from FIT database (Year: 2024).*
WO-2018229331-A1 translation from FIT database (Year: 2024).*
KR-20230142282-A translation from FIT database (Year: 2024).*
KR-102614930-B1 translation from FIT database (Year: 2024).*
Song, et al., "Significance of Ferroelectric Polarization in Poly (Vinylidene Difluoride) Binder for High-Rate Li-ioon Diffusion", Nano Energy, Dec. 23, 2016, 8 pgs.
Mokhtari, et al., "Electrospinning/Electrospray of Polyvinylidene Fluoride (PVDF): Piezoelectric Nanofibers", The Journal of the Textile Institute, Sep. 1, 2015, 17 pgs.
Chinese Office Action received for Chinese Application No. 202080050535.3 on Jan. 11, 2024, 9 pgs.
PCT International Search Report and Written Opinion for PCT Application No. PCT/FI2020/050492 mailed Oct. 8, 2020 (11 pages).
Finnish Search Report for FI Application No. 20195627 mailed Feb. 26, 2020 (2 pages).

* cited by examiner

| Measurement date | Time to charge to 80% capacity | Time to charge to 100% capacity |
|---|---|---|
| April 8, 2019 | 2 min 00 s | 2 min 56 s |
| April 9, 2019 | 1 min 56 s | 2 min 52 s |

Figure 4c

METHOD FOR REDUCING INTERNAL RESISTANCE OF A BATTERY AND A BATTERY WITH REDUCED INTERNAL RESISTANCE

CROSS-REFERENCE TO RELATED APPLICATIONS

This application is a National Stage Application of PCT/FI2020/050492, filed 10 Jul. 2020, which claims benefit of Ser. No. 20/195,627, filed 11 Jul. 2019 in Finland, and which applications are incorporated herein by reference. To the extent appropriate, a claim of priority is made to each of the above disclosed applications.

TECHNICAL FIELD

Various example embodiments relate to devices storing electric power such as batteries and accumulators, and respective manufacturing methods manufacturing such batteries and accumulators.

BACKGROUND

Various batteries have been developed for different uses, and there are a myriad of different types which mostly derive from used materials in an anode and/or a cathode and/or the electrolyte, or from the general technique or structure of the battery or based on the developer's name. Commonplace used types of batteries comprise lithium batteries, lithium-ion batteries (LIBs) and polymer-based batteries, just to name some of commonly used types. Also electric car development is a rapidly ongoing industry branch, and it requires efficient batteries as well for allowing sufficient driving ranges for vehicle users which have been used to traditional combustion engine vehicles. In connection with those applications, lithium-based batteries have been discussed, as well as nickel metal hybrides (NiMH) and zinc-air batteries.

If we take a lithium-ion battery (LIB) from general prior art into examination, there are many defects and characteristics, which have negative consequences regarding the lifetime of battery, regarding the aging speed of the battery in view of the performed rechargings and regarding the required charging time of the battery (from empty/low to full capacity). The main parameters of a battery are its capacity, charging speed and lifetime. Some optimization must be done with these three parameters, and with current LIBs from prior art, it is not possible to build a LIB with great capacity, short charging speed and long estimated lifetime. Currently some compromises need to be made in these respects.

The Battery University's web articles (see https://batteryuniversity.com/learn/article/how_to_prolong_lithium_based_batteries) specify some general characteristics of batteries and an effect of different parameters in the lifetime and capacity of the battery. E.g. article "BU-808: How to Prolong Lithium-based Batteries" discusses the effect of the charge voltage, charge current, depth of discharge (i.e. DoD), state of charge, discharge current and the internal resistance on lifetime and capacity of a battery. It mentions that if the peak charge voltage exceeds 4.2 V/cell, this dramatically shortens the number of discharge cycles, i.e. the lifetime of the battery. FIG. 5 of Article BU-808 illustrates this phenomenon well for charge voltages 4.25 V, 4.30 V and 4.35 V. It can be seen that the capacity is boosted a bit with an increased charge voltage, but the reduction in number of cycles is significant then.

Furthermore, Article BU-808b and its FIG. 4 demonstrates capacity loss caused by structural degradation of an older Li-ion battery when it is cycled at charge/discharge values of 1, 2 or 3 coulombs (with charge voltage 4.2 V and in room temperature 23° C.). The higher the charge, the capacity loss will happen sooner concerning the number of cycles. The theory is that higher C-rates (i.e. quicker charging times) will result in lithium plating at the anode, meaning an elevated capacity loss.

The Depth of Discharge (DoD) is a parameter which describes whether the battery charging is started when its state of charge is partially depleted, or whether it has been discharged to a fully empty state of charge, when the charging starts. The latter case means 100% DoD, and according to Table 2 of BU-808, this results in quite short battery life. If the DoD of 60-80% is applied, the battery lifetime will increase clearly (even double).

State of Charge (SoC) can be defined as "bandwidths" where an upper limit defines the charge level from the full (100%) capacity after the charging cycle, and a lower level defines the charge level when the charging is started after the discharge during use of the battery. Thus 100/25% means that a charging is started when a quarter of the full capacity is left, and the charging is performed to the full capacity. Referring to FIG. 6 of the Article BU-808 (the lower most graph), such charge/discharge bandwidth results in a large capacity loss (i.e. shorter service life). In the other end of the range, where a 75/65% charge/discharge bandwidth is used, the service life is much longer. In practice, this is partial utilization of the battery. Also high voltages and exposure to high temperatures degrades the battery quicker than cycling under normal conditions. From FIG. 6 it can be deduced that Li-ion batteries are quite sensitive to the charge/discharge levels used in practice.

Discharge current also affects the service life of the Li-ion battery. For instance, a discharge current of 15 A drops the capacity almost 20% after 500 cycles. This is exemplified in BU-208 ("Cycling performance"), FIG. 4.

The internal resistance of the battery is a relevant parameter as well. If it is large, it will prohibit a quick charging process. The Ohm's law U=IR means that if R is large, the value of U will easily reach the upper voltage limit of 4.2 V, and the voltage values over it are not feasible because of short service life (see in the above). Because the power $P=RI^2$, it means that with large internal resistance R, the battery will experience large heating (power loss) energies (power), and at worst, it could destroy the battery. A large internal resistance also restricts the discharge current. In case there is a large group of battery cells, either in series or in parallel, which are older, a large internal resistance also makes it difficult to charge them properly because of the above discussed characteristics.

The main primary problem of the prior art batteries is that their internal resistance is commonly relatively large, and it results in secondary problems discussed above regarding the short service life time, smaller capacity, and too long charging time.

The secondary problems can be widely seen in practice. Also currently there must be made some compromises whether to have a good capacity, a quick charging speed, or a long lifetime of the battery, and not all of these can be obtained simultaneously, restricting application areas or usage scenarios for the batteries.

Thus, there is a clear desire to obtain a battery or group of cells within a battery, whose internal resistance would be substantially lower than in prior art batteries.

SUMMARY

The present invention introduces a method for reducing internal resistance of a battery. Furthermore, the present invention comprises an aspect, where batteries and structures of batteries with small internal resistance are presented. This aspect also comprises selection of material or materials within the battery itself, in an embodiment. Further aspects comprise a manufacturing method for the battery, and a system for reducing an internal resistance of the battery.

In other words, the present invention introduces a method for reducing internal resistance of a battery, which is characterized in that the method comprises the steps of:
  providing charging current to a battery, where the charging current comprises spin-polarized and charged electrons,
  manufacturing the battery so that it comprises either ferroelectric or pyroelectric material either in an anode, in a cathode, in an other element of the battery, or in at least two of the elements comprised in the battery, where after at least one cycle of charging of the battery, the battery with reduced internal resistance is obtained.

In an embodiment of the invention, the method further comprises the step of:
  selecting the battery to be a lithium polymer (LiPo) battery or a polymer lithium-ion battery or a Na-ion battery or a Na-ion polymer battery.

In an embodiment of the invention, the method further comprises the step of:
  selecting the ferroelectric or pyroelectric material as polyvinylidene fluoride (PVDF) or modified materials thereof.

In an embodiment of the invention, the method further comprises the step of:
  the other element of the battery is a solid electrolyte, where the battery is a solid-state battery.

In an embodiment of the invention, further in the method:
  the ferroelectric or pyroelectric material in a same element or in at least two elements of the battery comprises at least two different materials.

In an embodiment of the invention, the method further comprises the step of:
  the charging of the battery is performed by a power source via a spin generator, providing the charging current to the battery, where the spin generator comprises at least one of PVDF, or modified materials thereof, SiC, $SiO_2$, PZT, $BiFeO_3$, $BaTiO_3$, Rochelle salt, zinc oxide, zinc sulfide, aluminium nitride, bismuth germanate.

According to a second aspect of the present invention, there is introduced a battery, provided with a reduced or reduceable internal resistance, which is characterized in that the battery comprises:
  either ferroelectric or pyroelectric material either in an anode, in a cathode, in an other element of the battery, or in at least two of the elements comprised in the battery, where after at least one cycle of charging of the battery, the battery with reduced internal resistance is obtained.

In an embodiment of the invention, further in the battery:
  the ferroelectric or pyroelectric material in a same element or in at least two elements of the battery comprises at least two different materials.

In an embodiment of the invention, the battery is further selected to be a lithium polymer (LiPo) battery or a polymer lithium-ion battery or a Na-ion battery or a Na-ion polymer battery.

In an embodiment of the invention, in the battery, the ferroelectric or pyroelectric material is selected to be polyvinylidene fluoride (PVDF) or modified materials thereof.

In an embodiment of the invention, the other element of the battery is a solid electrolyte, where the battery is a solid-state battery.

According to a third aspect of the present invention, there is introduced a manufacturing method for a battery, for manufacturing a battery with reduceable internal resistance. It is characterized in that the manufacturing method comprises the steps of:
  manufacturing either an anode, a cathode, or an other element of the battery so that it comprises either ferroelectric or pyroelectric material, or at least two of the elements comprised in the battery comprise either ferroelectric or pyroelectric material.

In an embodiment of the invention, the ferroelectric or pyroelectric material in a same element or in at least two elements of the battery comprises at least two different materials.

In an embodiment of the invention, the battery is further selected to be a lithium polymer (LiPo) battery or a polymer lithium-ion battery or a Na-ion battery or a Na-ion polymer battery.

In an embodiment of the invention, the ferroelectric or pyroelectric material is selected to be polyvinylidene fluoride (PVDF) or modified materials thereof.

In an embodiment of the invention, the other element of the battery is a solid electrolyte, where the battery is a solid-state battery.

According to a fourth aspect of the present invention, there is introduced a system for reducing internal resistance of a battery (204, 300). The system is characterized in that the system comprises:
  a battery;
  a spin generator;
  a power source; wherein
  the power source via the spin generator is configured to provide charging current to the battery, where the charging current comprises spin-polarized and charged electrons,
  the battery is configured to comprise either ferroelectric or pyroelectric material either in an anode, in a cathode, in an other element of the battery, or in at least two of the elements comprised in the battery, where after at least one cycle of charging of the battery,
  the battery with reduced internal resistance is obtained.

In an embodiment of the invention, further in the system:
  the ferroelectric or pyroelectric material in a same element or in at least two elements of the battery comprises at least two different materials.

In an embodiment of the invention, further in the system:
  the battery is further selected to be a lithium polymer (LiPo) battery or a polymer lithium-ion battery or a Na-ion battery or a Na-ion polymer battery.

In an embodiment of the invention, the ferroelectric or pyroelectric material is selected to be polyvinylidene fluoride (PVDF) or modified materials thereof.

In an embodiment of the invention, the other element of the battery is a solid electrolyte, where the battery is a solid-state battery.

In an embodiment of the invention, further in the system: the spin generator comprises at least one of PVDF, or modified materials thereof, SiC, $SiO_2$, PZT, $BiFeO_3$, $BaTiO_3$, Rochelle salt, zinc oxide, zinc sulfide, aluminium nitride, bismuth germanate.

DETAILED DESCRIPTION

In an embodiment, the present invention introduces a method for reducing internal resistance of a battery. Similarly, a corresponding battery with small internal resistance is introduced in an embodiment. Furthermore, a system and procedure for creating a battery with the desired effect of a small internal resistance is introduced in an embodiment. A manufacturing method of a battery with invented characteristics is also an aspect of the present invention.

In an embodiment, the applied battery of the present invention is a lithium battery or a Li-ion battery.

In an embodiment, the applied battery of the present invention is a polymer Li-ion battery.

In an embodiment, the applied battery of the present invention is a Na-ion battery (i.e. a sodium ion battery) or a Na-ion polymer battery.

Figure 1:
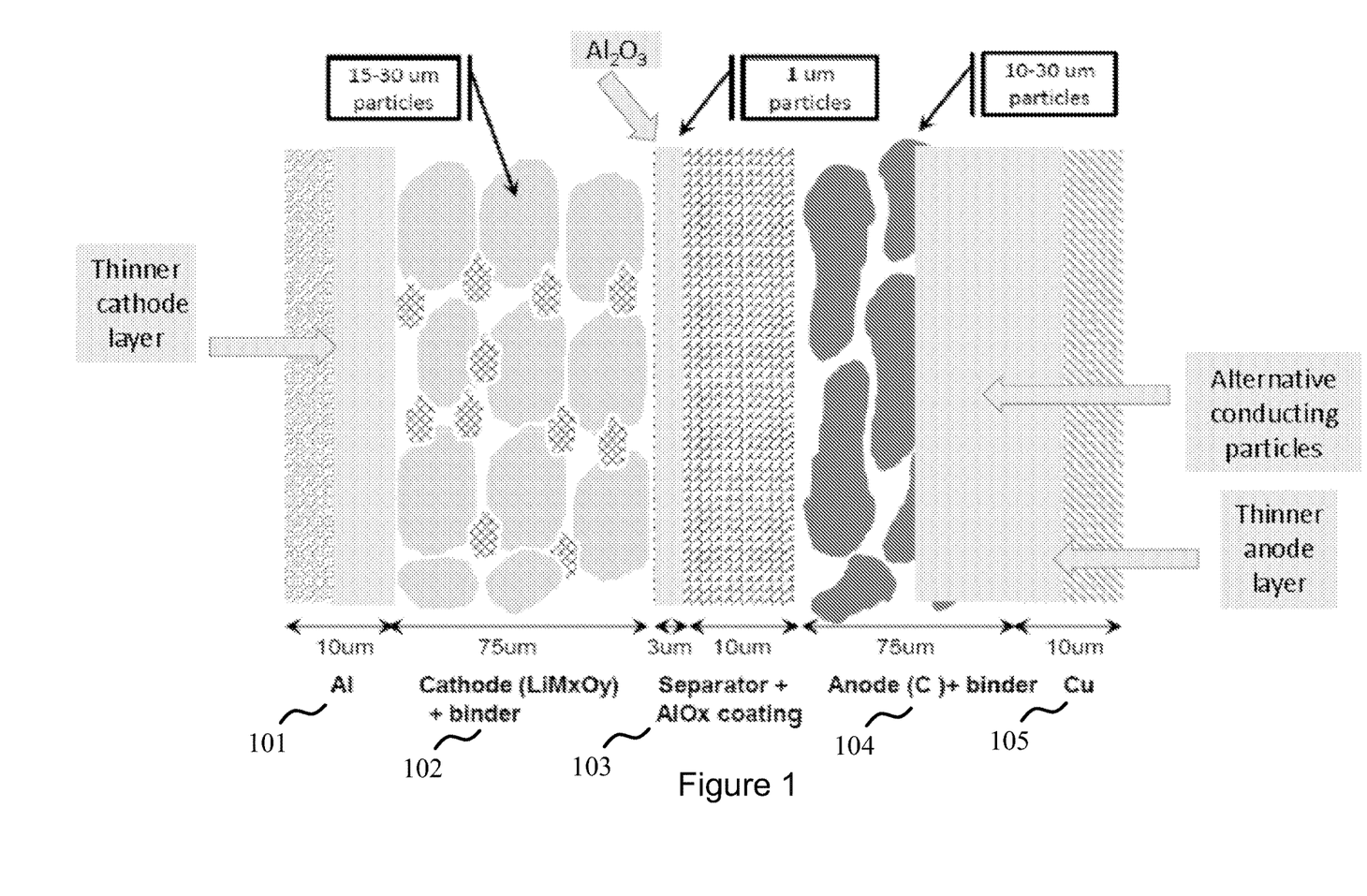
FIG. 1 illustrates an example of Li-ion battery material layers.

FIG. 1 illustrates an example of a Li-ion battery, and its internal material layers. The basic elements i.e. layers in such a battery are a cathode, a separator (film), and an anode. Coatings, binders, and a housing layer can be applied as well. In the illustrated example, there is shown a battery structure and dimensions of a Samsung Galaxy Note 7 smartphone, which had famous battery problems caused by problems in the separation between the anode and the cathode, resulting in excessive heating of the battery, and even in explosion-type of fire and destruction of the battery and the smartphone. The manufacturing and sales of these smartphones have since been cancelled.

The main parts in this example are an Al layer 101 as a cathode current collector, a cathode layer 102, a separator film layer 103, an anode layer 104 and a Cu layer 105 as an anode current collector. Their dimensions in this example are shown in the drawing as well.

The cathode layer 102 comprises cathode material and a binder, where the cathode material may comprise lithium and other selected metal(s) (marked as $M_x$). The anode layer 104 comprises anode material and a binder, where the anode material may comprise graphite or graphite mixture (marked as C).

It is possible to apply a thinner cathode layer (marked in the drawing), and to apply 15-30 micrometer particles for selected metal M in layer 102. Furthermore, the separator film layer 103 may comprise a separator (e.g. 10 micrometers thick) and a coating made e.g. from aluminium oxide ($Al_2O_3$). The aluminium oxide coating may be formed from particles sized around 1 micrometer. The anode layer 104 may comprise particles sized around 10-30 micrometers. As for the cathode, it is possible to apply a thinner anode layer (marked in the drawing), and to apply alternative conducting particles as marked in the drawing.

As a further note regarding separator film layers 103, the coating made of e.g. $Al_2O_3$ may be manufactured as a porous coating in order to obtain lots of surface area within the separator structure. While the drawing mentions a micrometer thickness for the coating of the separator film layer, a porous layer of thickness 1-3 micrometers is also feasible.

Figure 2:
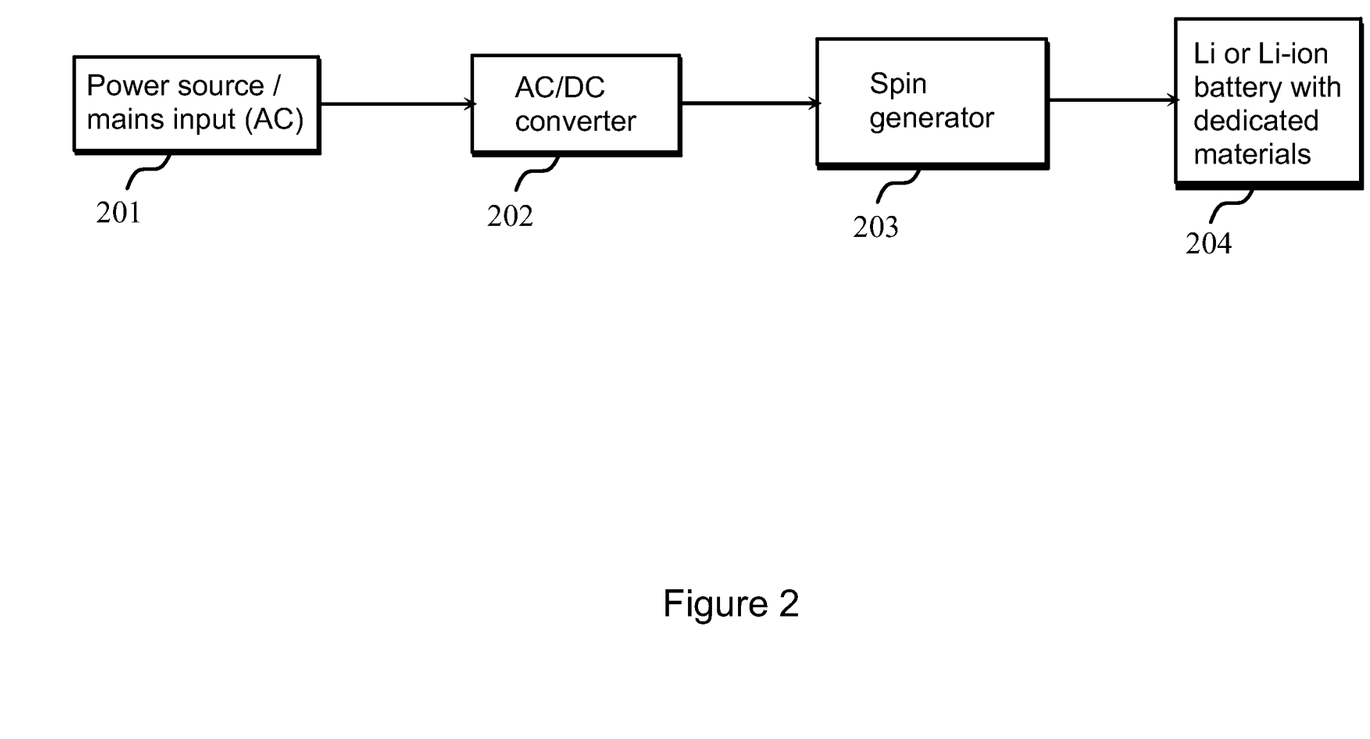
FIG. 2 illustrates an embodiment of the system used for creating a battery with reduced internal resistance.

Now going into a system according to an embodiment of the present invention, we refer to FIG. 2. The system comprises a battery, but also an arrangement configured to transform the battery to a state, where it shows a reduced internal resistance. The system can be also called as a configuration, where a battery having certain physical internal structure or material selections can be charged with a dedicated spin generator, resulting in advantageous electrical properties within the battery.

The main structure of this embodiment is illustrated in FIG. 2. The system comprises a main input i.e. a power source 201, an AC/DC converter 202, a spin generator 203, and a lithium or Li-ion battery 204.

While FIG. 2 mentions a Li or Li-ion battery with dedicated materials, the present invention can well be applied with a sodium ion battery or a sodium ion polymer battery as well. In this regard, FIG. 2 illustrates only an example.

The spin generator 203 is configured to perform polarization of the current conducting electrons. By polarization, actually the spin polarization of the electrons is meant. While the spin generator 203 itself can be a passive element, it may have a specific structure allowing such transform of the current conducting electrons. The effect "propagates" into the battery 204, where it also lasts for a long period of time. Proof of these effects are discussed later.

In an embodiment, the spin generator 203 may apply several different methods for creating so-called spin current. These methods comprise tunneling methods i.e. quantum tunneling, so-called "lateral methods", and by using very powerful magnetic fields. An example of a device applying quantum tunneling is a GMR (i.e. Giant magnetoresistive) sensor. An example of a lateral method is described in e.g. "Control of spin injection by direct current in lateral spin valves", F. Casanova, A. Sharoni, M Erekhinsky, I. Schuller, Physics Department, University of California, CA, USA, 7 Mar. 2009.

The battery 204 of the system in this embodiment is manufactured so that it comprises polarizing material at least in one of the elements comprising an anode, a cathode and/or a separator film. Also current collectors, coatings and binders can be such elements of the battery. In an embodiment, the selected polarizing material or materials are ferroelectric and/or pyroelectric and/or piezoelectric material(s).

Concerning generally the batteries and its internal parts, and what the internal resistance of the battery actually comprises as components, the following can be said for the batteries without a liquid electrolyte. In case a solid electrolyte is used, with the present invention it has been noted that a solid electrolyte seems to be especially sensitive for the effects of current conducting electrons affected by the spin generator 203. This means that the spin generator affected current seems to have a major effect on the solid electrolyte of the battery, which can be seen as much smaller internal resistance component within the solid electrolyte (such as e.g. polymer-based solid electrolyte). The spin generator affected current also has an effect decreasing the respective internal resistance components also for the conducting materials, such as the anode and cathode, and the conducting wires to/from the electrodes, although this effect currently seems to be much less than with the internal resistance component formed within the solid electrolyte. Furthermore, it is noted that the internal resistance components within the interfaces between the electrodes and the battery chemistry are also relatively large among the whole internal resistance of the battery.

In an embodiment, two or more different ferro-, pyro- or piezoelectric materials can be used within the element(s) of the battery. The main denominator is that the battery comprises material, which enables the polarizing effect on current carrying electrons through charging current from an external power source.

In an embodiment of the invention, the battery 204 comprises polyvinylidene fluoride (i.e. PVDF) in one or several of the battery elements: anode, cathode, separator film, binders, coatings, anode current collector, cathode current collector. In an embodiment, PVDF can be used as a binder material for the anode, or as a binder material for the cathode, or both.

In an embodiment of the invention, the concept of applying PVDF comprises also any modified materials thereof. In other words, the battery may comprise a modified PVDF, where the modifications may comprise added functional groups or added polymer chains or branches to the regular PVDF structure.

In an embodiment discussing a way of manufacturing of the battery, and materials used there, PVDF is a material, which is a highly non-reactive thermoplastic fluoropolymer which can be made by polymerization of vinylidene difluoride. It comprises strong piezoelectric characteristics, where the piezoelectric coefficient of poled thin films can be appr. 6-7 pC/N, which is significantly larger than in any other polymers. When poled, PVDF is a ferroelectric polymer, which also has notable piezoelectric and pyroelectric properties.

Furthermore, in connection with the discussed battery application and an embodiment of it, a 1-2 weight-% solution of PVDF dissolved in N-methyl-2-pyrrolidone (NMP) can be mixed with an active lithium storage material such as graphite, silicon, tin, $LiCoO_2$, $LiMn_2O_4$, or $LiFePO_4$, and a conductive additive such as carbon black or carbon nanofibers. This slurry can be cast onto a metallic current collector and the NMP is evaporated to form a composite or paste electrode. PVDF can be used because it is chemically inert over the used potential range and it does not react with the electrolyte or lithium.

In an embodiment, the used PVDF can be a copolymer or a terpolymer of PVDF because the first ones employ piezoelectric characteristics and the latter ones employ ferroelectricity.

Figure 3:
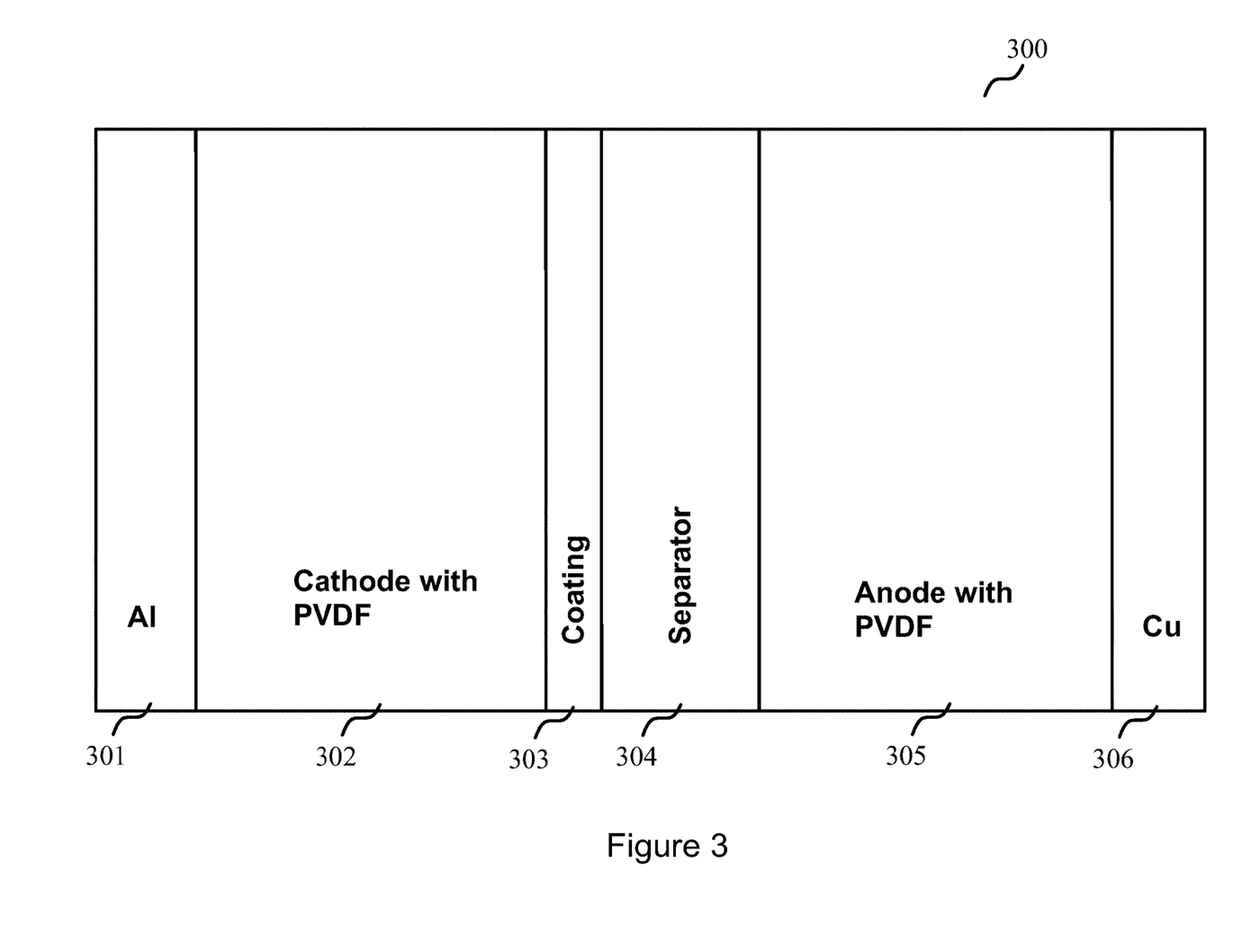
FIG. 3 illustrates an embodiment of the battery with a certain element characteristics allowing the invented effect to take place.

FIG. 3 illustrates a simple schematic drawing of a structure of a Li-ion battery 300 with certain material selections in its elements, in an embodiment of the invention. Cathode current collector 301 may be formed from aluminium, and anode current collector 306 may be formed from copper. The separator film (303, 304) may form in this example from the separator 304 and its coating 303, where the material of the coating 303 can be aluminium oxide ($Al_2O_3$) but it is not restricted to only this material. In an embodiment, cathode material 302 without a binder can be selected from a group of $LiNiCoMnO_2$ (NMC), $LiFePO_4$ (LFP), $LiNiCoAlO_2$ (NCA), $LiMn_2O_4$ (LMO), $LiNi_{0.5}Mn_{1.5}O_4$ (LNMO) and $LiCoO_2$ (LCO).

The cathode 302 may be formed from actual cathode material, such as cobalt, nickel, and/or manganese in a crystal structure forming a multi-metal oxide material, with lithium added as well. The cathode 302 comprises a binder, which can be PVDF, or other ferro-, pyro- or piezoelectric material. The manufacturing method of the cathode 302 can be the one described earlier, but any other feasible manufacturing method can be applied as well.

The same applies to the anode 305, respectively, i.e. the anode 305 may be formed from actual anode material, such as carbon black, graphite, graphene, Lithium titanate (LTO) or silicon. The anode 305 comprises a binder, which can be PVDF, or other ferro-, pyro- or piezoelectric material. The manufacturing method of the anode 305 can be the one described earlier, but any other feasible manufacturing method can be applied as well.

Instead of PVDF, any modified materials thereof may be applied. This concerns respective elements of the battery, such as a cathode 302, or an anode 305 or both. Also, a solid electrolyte is one possible element to be applied with PVDF or any modified materials thereof, in another embodiment.

The phenomenon, which seems to happen with the battery according to the invention, and with a spin generator according to the invention, is explained in the following. We'll use a quantity called a spin-torque current in the following explanations.

The spin-torque current is a current flowing between regions, which have different spin directions of the spin-polarized electrons. The spin-torque current induces a spin torque on the spin-polarized electrons. The spin torque rotates spin directions in neighbor regions toward each other. The spin-torque current aligns the spins of all spin-polarized electrons in one direction over the whole sample. In contrast to the spin current, which is the diffusion of the spin accumulation, the spin-torque current is the diffusion of the direction of the spin accumulation.

In summary, spins of all spin-polarized electrons all over the whole sample are trying to be in one direction. In case in some region the spin direction of spin-polarized electrons turns out of the common spin direction, the spin-torque current will flow between different regions of the sample until all spin-polarized electrons are realigned along one common spin direction. Also, the spin torque current is the current of the conduction electrons only.

In other words, a spin-torque current is the current of the spin direction. The spin direction diffuses between regions of different directions of spin accumulation. The spin-torque current aligns spins in neighboring regions in a single direction.

Some properties of the spin-torque current include the following. Firstly, the spin-torque current is trying to align spins of all spin-polarized electrons in one direction over the whole sample. Secondly, the spin-torque current is greater in a metal with a shorter spin diffusion length. Thirdly, the spin-torque current is always accompanied by an additional spin relaxation. This means that the spin life time becomes shorter in regions where the spin-torque current flows.

Still said in other words, if the spin directions of spin-polarized electrons are different in two close regions in a metal, there is a mutual diffusion of electrons between these two regions. Since the spin direction of the diffused electrons is different, they cause a spin torque, which rotates the spin direction of the spin-polarized electrons. Because of this spin torque, the spin directions of each region are turning toward each other.

Still to clarify different concepts (terms) used in the literature, the charge current means a flow of charge. A spin current means a flow of spin. Relevant for this disclosure, a spin-torque current means a flow of spin direction.

In the present invention, the ferroelectric, pyroelectric or piezoelectric material comprised in the applied battery will be polarized as explained above, when the battery is charged with a dedicated spin generator, or with other means capable to perform the same effect. The charging procedure will result in an effect, where the spin directions of each region (i.e. within and between the functional elements) within the battery will turn towards each other, resulting in significant changes (i.e. improvements) in electrical properties of the battery, explained in the end part of the specification. The spin generator may be generated in various structural ways, and in general in this description, we consider it as "a black box", whose functionality is however discussed in detail in this description.

Now going into an example of an existing polymer lithium ion battery (6745135-100; 3.7 V, 4000 mAh), its manufacturer AA Portable Power Corporation (Richmond, California, USA) specifies that the nominal capacity is 4 Ah±5%, the nominal voltage is 3.7 V, standard charge is 0.2 C meaning that standard charge current is 0.8 A, maximum charge current is 4 A corresponding to 1 C, charge cut-off voltage is 4.2 V±0.05 V, discharge current is 40 A corresponding to 10 C (maximum available is 60 A corresponding to 15 C), and discharge cut-off voltage is 2.75 V. The impedance is specified as less or equal than 10 mΩ (with AC 1 kHz after 50% charge, in 25° C.). The cycle life has been tested by the manufacturer so that they repeat certain charging/discharging between the cut-off voltages with charge/discharge current of 4 A, until the discharging time remains less than 36 minutes. Then at least 300 cycles are guaranteed by the battery manufacturer.

The following endurance test was performed for this polymer Li-ion battery model, when the battery is charged with the dedicated spin generator presented earlier in connection to the present invention. This is an AC measurement because of practical reasons, thus we talk about internal impedance instead of an internal resistance. The battery was charged and discharged for 500 (+250) cycles. After 500 cycles, the battery capacity was 95% of the original capacity. The charge cut-off voltage in the test was 4.28-4.29 V. The charge current was 100 A (25 C) in the capacities 0-95%, and 28 A (7 C) in the capacities 95%-100%. The depth of discharge was >100%, with cut-off voltages of 4.28 V and 2.9 V. State of Charge (SoC) could vary between 100-0%; i.e. the whole available range. The discharge current was in average 15 A. Now with these parameters in the endurance test, the internal impedance behaves like in the following. As a new battery, the internal impedance was 1.38 mΩ. During the actual use of the battery, the internal impedance was 0.9-1.0 mΩ. After 500 cycles, the internal impedance was 1.8 mΩ. This means that the internal impedance has decreased by 82% compared to the guaranteed value of 10 mΩ, even after an extensive number of cycles already performed with the battery. This is a significant reduction in the internal impedance.

If this battery model would be used with these endurance test parameters, while charged with a regular charging cable, this would age the battery very rapidly so that the estimated lifetime would last only for 10-20 cycles; if it is suggested that the battery would physically last these harsh testing conditions. In practice, the battery would last less than a minute because of too much excessive heating which leads to electric shortcuts and thus, to combustion and explosion of the battery.

Figure 4A:
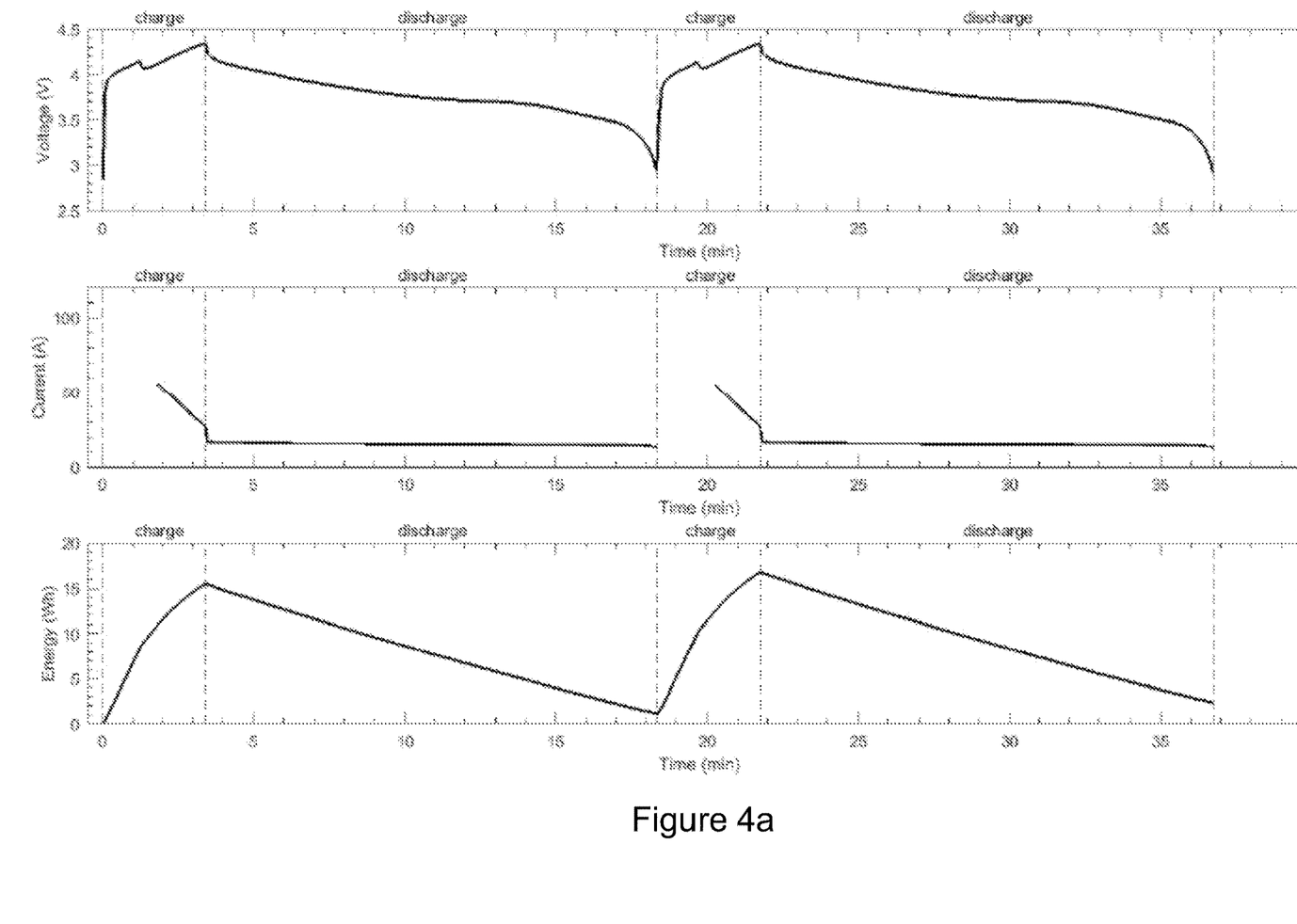
FIG. 4a illustrates results from third party measurements showing the effect of the present invention: Battery voltage, charge/discharge current and the energy stored in the battery in the Apr. 9, 2019 test.
Figure 4B:
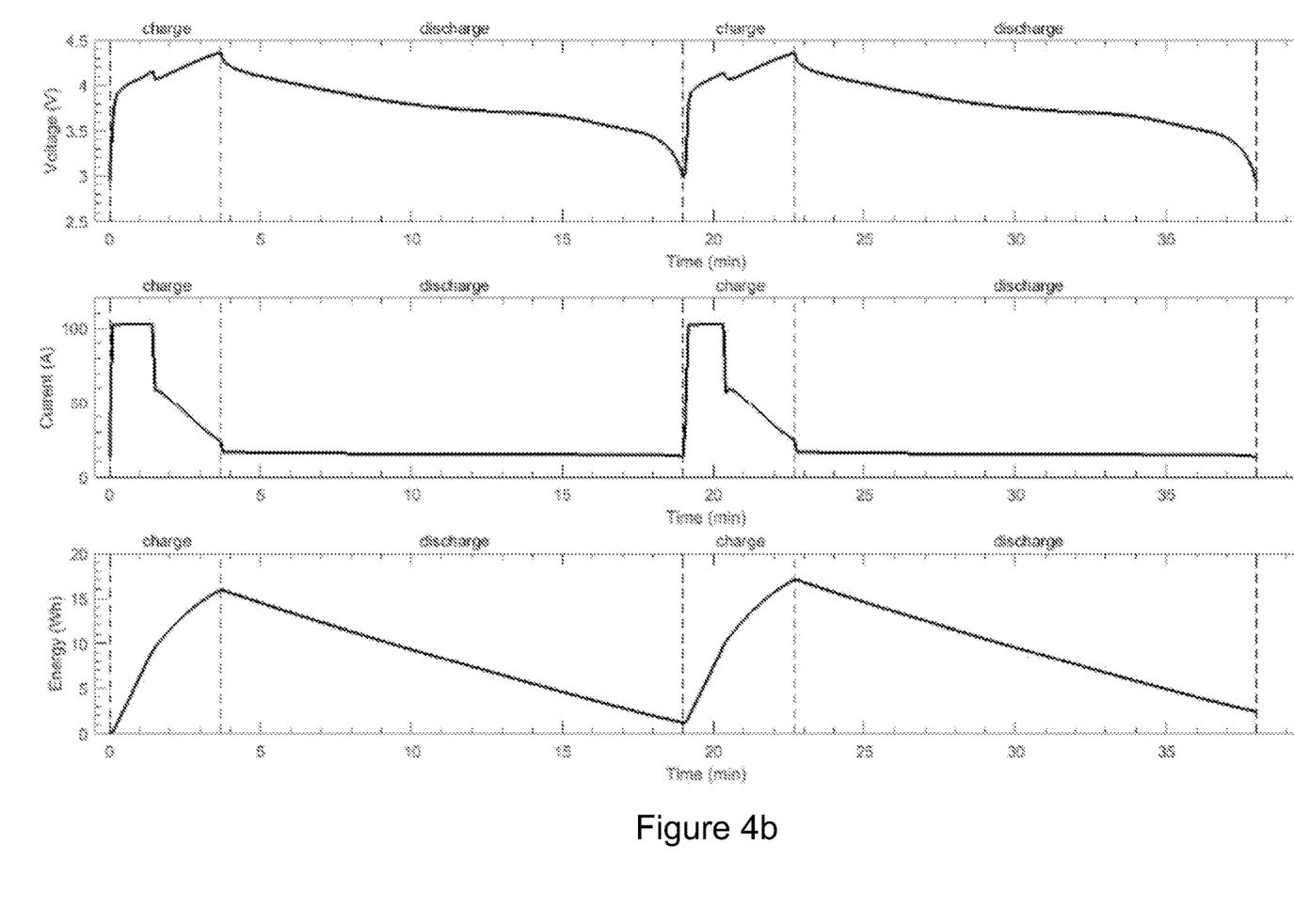
FIG. 4b illustrates results from third party measurements showing the effect of the present invention: Battery voltage, charge/discharge current and the energy stored in the battery in the Apr. 8, 2019 test.
Figure 4C:
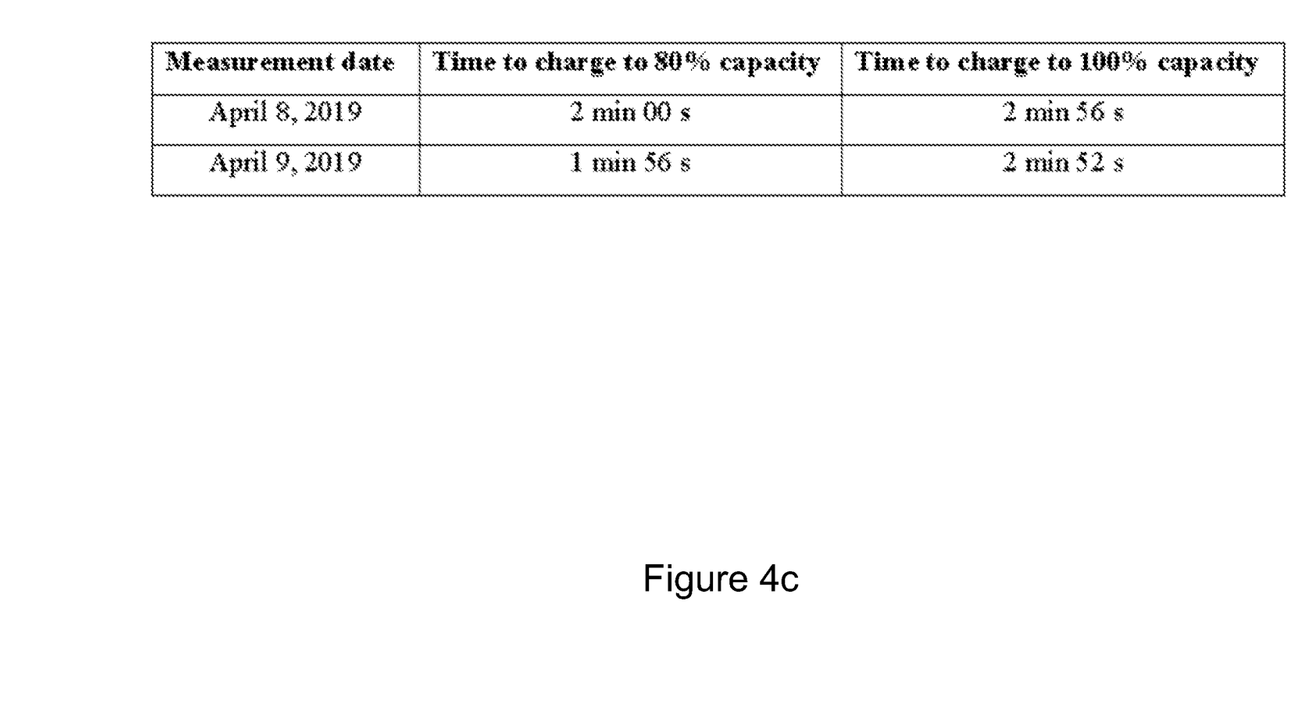
FIG. 4c shows a table with times to charge the battery to 80% and 100% capacities, in the conducted measurements.

FIG. 4 illustrates further measurement results made by an external entity (a researcher in University of Eastern Finland, based in Kuopio) for the same battery model as disclosed above. We cover the experimental setup extensively in the following.

In other words, a lithium polymer (LiPo) battery was charged and discharged periodically by using a dedicated spin generator, which utilise the polarisation of conduction electrons. The aim of the test was to show that by using the dedicated spin generator it is possible to repeatably charge the battery in a shorter time and with higher charge current than by using traditional charging cables. In the second part of the test, the internal impedance of the battery was measured. The test was carried out on Apr. 9, 2019 at the Department of Applied Physics at the University of Eastern Finland.

The experimental setup used in the battery charging test consisted of the following components:
  Polymer Lithium-ion battery 6745135-10C (AA Portable Power Corp., Richmond, California, USA), detailed specifications already discussed in the above
  MEAN WELL HRP-450-5 switch mode power unit (MEAN WELL Enterprises Co., Ltd, New Taipei City, Taiwan)
  Custom-made charging control unit (Spindeco Technologies Oy), charge algorithm: two-phase constant voltage control (4.15/4.30 V)
  Dedicated spin generator
  Yokogawa WT500 power analyzer+Yokogawa WT230 power analyzer to verify the readings of the first power analyzer (Yokogawa Electric Corporation, Tokyo, Japan)
  Thermocouple+digital multimeter for monitoring the temperature of the battery
  Five H4 bulbs as a load during battery discharge The battery was charged and discharged periodically so that the charging and discharging started automatically. The battery voltage, charge/discharge current and the energy stored in the battery were logged at a rate of 0.2 Hz.

In the second part of the test, the internal impedance of a LiPo battery was measured according to IEC 62133 standard. The setup for this measurement consisted of the following components:
  Polymer Lithium-ion battery 6745135-10C (AA Portable Power Corp., Richmond, California, USA), the same test battery as above
  Agilent 33220A 20 MHz Function/Arbitrary Waveform Generator (Agilent Technologies Inc., Santa Clara, California, USA)
  Yamaha Natural Sound Stereo Receiver R-300 (Yamaha Corporation, Hamamatsu, Japan) as an amplifier
  Digital multimeters for measuring current and voltage A sinusoidal signal of 1 kHz frequency was supplied by the function generator and the stereo receiver was used to adjust an approx. 1 A current to a series circuit containing protective resistor and the battery. The voltage across the battery terminals was measured with a digital multimeter and, because the current was 1 A, the measured voltage in millivolts corresponded to the internal impedance of the battery in milliohms.

The results are shown in FIGS. 4a and 4b, and also in a table presented in FIG. 4c.

FIG. 4a shows the battery voltage, charge/discharge current and the energy stored in the battery for two subsequent charge-discharge cycles in the Apr. 9, 2019 test. The current exceeded the range of the power analyzer during the first phase of the charging process and, thus, the current data are missing from these periods. FIG. 4b shows similar graphs from the test carried out on the previous day (Apr. 8, 2019), when the maximum current was slightly lower and the power analyzer recorded the current correctly. From the figures it can be seen that the voltage, current and energy behave in the same manner in both tests and, thus, the results of the April 9 test (i.e. FIG. 4a) are valid regardless of partial missing of the current data.

In the second part of the test, the internal impedance of the battery was measured. The voltage across the battery terminals was measured to be approx. 1.3 mV at a 1 A current, which corresponds to an internal impedance of 1.3 mΩ.

As a result, FIGS. 4a and 4b clearly show the two-phase charging process of the battery. In the first phase, the battery is charged to a DC voltage of 4.15 V with an approx. 100 A current in about 80-90 s. In the second phase, the battery is charged to a voltage of 4.3 V with a current decreasing from approx. 60 A to approx. 25 A in about 120-130 s. Thus, the total charge time is about 200-220 s. The discharge current is almost constant approx. 15 A and the discharge time is about 15 min. The maximum energy stored in the battery is about 15 Wh.

The table in FIG. 4c shows more detailed results for measured charge times to charge the battery to 80% and 100% capacities, respectively. These time values are calculated by assuming that the battery is fully charged when the energy stored in it reaches 14.3 Wh (nominal value of 13.6 Wh given by the battery manufacturer+5% energy loss). From the results it can be seen that the battery is charged to 80% capacity in about two minutes and to 100% capacity in just under three minutes. These results again verify the consistency of April 8 and April 9 measurements.

The measured charge times were much shorter than known standard charge times for the LiPo battery model used in the tests. This is most likely due to low internal resistance and high charge current, which both also deviated significantly from known standard values for this battery model. Despite the charge current being well above the standard values, the charge/discharge process was well-repeatable and the temperature of the battery stayed below the safety limit (60° C.) throughout the test. Extensive endurance tests carried out by Spindeco Technologies Oy have shown that LiPo batteries can withstand hundreds of similar charge/discharge cycles without performance degradation when using a dedicated spin generator. The results of this test are consistent with the observations made during the endurance tests.

Thus, the effect of the dedicated spin generator onto the specific battery structure is significant. The lifetime of the battery is drastically longer, the battery will survive the harsh charging/discharging conditions, and the most importantly, the internal resistance of the battery will remain significantly low (1.8 mΩ) even after 500 charging/discharging cycles. All the problems and defects mentioned e.g. in the prior art article BU-808 can be overcome, when the internal resistance is maintained in a low level. The low level of the internal resistance of the battery is obtained by the presented dedicated spin generator and the presented battery structure, in an embodiment of the invention, as proven in the above tests, and verified in the above third party measurements (FIGS. 4a-c). The advantages of the present invention are thus tangible and dramatic, and they have lots of positive consequences for various application areas.

Much higher charging currents and much shorter charging times can thus be used without degradation of the performance of the batteries, and also without any danger to overheat the battery, which would result in undesired consequences (fire/explosion).

Many application areas have benefits from the embodiments of the present invention. For instance, the car industry and especially electric vehicles (i.e. EV) with their extensive battery units are a good application area, where the presented embodiments can be well used. Other practical application areas comprise battery-driven electric working tools and instruments, smartphones and tablet computers, and even other battery-driven transportation means such as electric-driven bicycles. One application area is formed by batteries storing energy created from available green energy systems, for instance. Examples comprise wind energy and energy gathered via solar panel(s). Of course, the storage of produced electrical energy through more traditional systems is also possible where the present invention may be applied.

One applicable area among batteries for the present invention is formed by the so-called solid-state batteries. They apply solid electrodes and a solid electrolyte. The solid electrolyte may be formed from ceramic substance(s), glass or lithium sulfide, but these are mere examples for the present invention.

Of course, any devices, gadgets, tools, energy storing applications, personal and public transportation means, telecommunications devices and practically any systems and apparatuses using or applying at least partly any kind of batteries form a possible application area for the present invention.

At least two of the previously mentioned features in this disclosure may be combined in order to form an additional embodiment of the present invention.

The present invention is not restricted merely into the examples presented above, but the scope of the present invention is defined by the claims.

The invention claimed is:

1. A method for reducing internal resistance of a battery, wherein the method comprises the steps of:
   manufacturing a battery so that the battery comprises either ferroelectric or pyroelectric material either in an anode, in a cathode, in another element of the battery, or in at least two among a group of the anode, the cathode, and the another element of the battery;
   providing a charging current to the battery to polarize the either ferroelectric or pyroelectric material in the anode, the cathode, or the another element of the battery, wherein the charging current comprises spin-polarized and charged electrons that have a spin aligned in a common spin direction;
   wherein after at least one cycle of charging of the battery with the charging current, the battery with reduced internal resistance is obtained.

2. The method according to claim 1, wherein the method further comprises the step of:
   selecting the battery to be a lithium polymer (LiPo) battery or a polymer lithium-ion battery or a Na-ion battery or a Na-ion polymer battery.

3. The method according to claim 1, wherein the method further comprises the step of:
   selecting the ferroelectric or pyroelectric material as polyvinylidene fluoride (PVDF) or modified materials thereof.

4. The method according to claim 1, wherein:
the another element of the battery is a solid electrolyte, wherein the battery is a solid-state battery.

5. The method according to claim 1, wherein:
the ferroelectric or pyroelectric material comprises at least two different materials.

6. The method according to claim 1, wherein the method further comprises the step of:
performing the at least one cycle of charging of the battery by a power source via a spin generator, providing the charging current to the battery, wherein the spin generator comprises at least one of PVDF, or modified materials thereof, SiC, SiO·sub·2, PZT, $BiFeO_3$, $BaTiO_3$, Rochelle salt, zinc oxide, zinc sulfide, aluminium nitride, bismuth germanate.

* * * * *